(12) United States Patent
Kalantidis et al.

(10) Patent No.: US 12,013,700 B2
(45) Date of Patent: Jun. 18, 2024

(54) UNSUPERVISED CONTRASTIVE LEARNING OF VISUAL REPRESENTATIONS USING NEGATIVE MIXING

(71) Applicant: NAVER CORPORATION, Gyeonggi-do (KR)

(72) Inventors: Ioannis Kalantidis, Grenoble (FR); Diane Larlus, La Tronche (FR); Philippe Weinzaepfel, Montbonnot-Saint-Martin (FR); Mert Bulent Sariyildiz, Grenoble (FR); Noé Pion, Plaisance (FR)

(73) Assignee: NAVER CORPORATION, Gyeonggi-Do (KR)

( * ) Notice: Subject to any disclaimer, the term of this patent is extended or adjusted under 35 U.S.C. 154(b) by 541 days.

(21) Appl. No.: 17/239,501

(22) Filed: Apr. 23, 2021

(65) Prior Publication Data

US 2022/0107645 A1 Apr. 7, 2022

Related U.S. Application Data

(60) Provisional application No. 63/086,645, filed on Oct. 2, 2020.

(51) Int. Cl.
| | |
|---|---|
| *G05D 1/00* | (2006.01) |
| *G06F 16/532* | (2019.01) |
| *G06F 16/55* | (2019.01) |
| *G06F 16/56* | (2019.01) |
| *G06F 18/214* | (2023.01) |
| *G06F 18/22* | (2023.01) |
| *G06F 18/241* | (2023.01) |

(Continued)

(52) U.S. Cl.
CPC ......... *G05D 1/0212* (2013.01); *G05D 1/0231* (2013.01); *G06F 16/532* (2019.01); *G06F 16/55* (2019.01); *G06F 16/56* (2019.01); *G06N 5/04* (2013.01); *G06N 20/00* (2019.01); *G06T 9/002* (2013.01); *G06F 18/2155* (2023.01); *G06F 18/22* (2023.01); *G06F 18/241* (2023.01); *G06V 20/56* (2022.01)

(58) Field of Classification Search
CPC .... G05D 1/0212; G05D 1/0231; G06F 16/55; G06F 16/532; G06F 16/56; G06F 18/22; G06F 18/2155; G06F 18/241; G06N 20/00; G06N 5/04; G06T 9/002; G06V 20/56

See application file for complete search history.

(56) References Cited

U.S. PATENT DOCUMENTS

2020/0380027 A1* 12/2020 Aggarwal ............. G06F 16/538

OTHER PUBLICATIONS

A. Iscen, G. Tolias, Y. Avrithis, and O. Chum. Mining on manifolds: Metric learning without labels. In CVPR, 2018.

(Continued)

*Primary Examiner* — Michael D Lang

(57) ABSTRACT

A training system includes: an encoder module configured to receive a query image and to generate a first vector representative of one or more features in the query image using an encoder; a mixing module configured to generate a second vector by mixing a third vector, representative of one or more features in a second image that is classified as a negative relative to the query image, with a fourth vector; and an adjustment module configured to train the encoder by selectively adjusting one or more parameters of the encoder based on the first vector and the second vector.

20 Claims, 10 Drawing Sheets

(51) Int. Cl.
- *G06N 5/04* (2023.01)
- *G06N 20/00* (2019.01)
- *G06T 9/00* (2006.01)
- *G06V 20/56* (2022.01)

(56) References Cited

OTHER PUBLICATIONS

A. Miech, J.B. Alayrac, L. Smaira, I. Laptev, J. Sivic, and A. Zisserman. End-to-End Learning of Visual Representations from Uncurated Instructional Videos. In CVPR, 2020.

B. Fernando, H. Bilen, E. Gavves, and S. Gould. Self-supervised video representation learning with odd-one-out networks. In CVPR, 2017.

B. Korbar, D. Tran, and L. Torresani. Cooperative learning of audio and video models from self-supervised synchronization. In NeurIPS, 2018.

C. Sun, A. Myers, C. Vondrick, K. Murphy, and C. Schmid. VideoBERT: A joint model for video and language representation learning. In ICCV, 2019.

C. Sun, F. Baradel, K. Murphy, and C. Schmid. Learning video representations using contrastive bidirectional transformer. arXiv preprint arXiv: 1906.05743, 2019.

C. Wei, H. Wang, W. Shen, and A. Yuille. Co2: Consistent contrast for unsupervised visual representation learning. arXiv preprint arXiv:2010.02217, 2020.

C.-H. Ho and N. Vasconcelos. Contrastive learning with adversarial examples. In NeurIPS, 2020.

C.-Y. Chuang, J. Robinson, L. Yen-Chen, A. Torralba, and S. Jegelka. Debiased contrastive learning. In NeurIPS, 2020.

D. Wei, J. J. Lim, A. Zisserman, and W. T. Freeman. Learning and using the arrow of time. In CVPR, 2018.

D. Xu, J. Xiao, Z. Zhao, J. Shao, D. Xie, and Y. Zhuang. Self-supervised spatiotemporal learning via video clip order prediction. In CVPR, 2019.

E. Orhan, V. V. Gupta, and B. M. Lake. Self-supervised learning through the eyes of a child. In NeurIPS, 2020.

H. Alwassel, D. Mahajan, L. Torresani, B. Ghanem, and D. Tran. Self-supervised learning by cross-modal audio-video clustering. NeurIPS, 2020.

H. Liu and P. Abbeel. Hybrid discriminative-generative training via contrastive learning. arXiv preprint arXiv:2007.09070, 2020.

H. Xu, H. Xiong, and G.-J. Qi. K-shot contrastive learning of visual features with multiple instance augmentations. arXiv preprint arXiv:2007.13310, 2020.

H. Xuan, A. Stylianou, X. Liu, and R. Pless. Hard negative examples are hard, but useful. In ECCV, 2020.

H. Zhong, C. Chen, Z. Jin, and X.-S. Hua. Deep robust clustering by contrastive learning. arXiv preprint arXiv:2008.03030, 2020.

H.-Y. Lee, J.-B. Huang, M. Singh, and M.-H. Yang. Unsupervised representation learning by sorting sequences. In ICCV, 2017.

H.-Y. Zhou, S. Yu, C. Bian, Y. Hu, K. Ma, and Y. Zheng. Comparing to learn: Surpassing imagenet pretraining on radiographs by comparing image representations. In MICCAI, 2020.

I. Misra, C. L. Zitnick, and M. Hebert. Shuffle and learn: unsupervised learning using temporal order verification. In ECCV, 2016.

J. D. Lee, Q. Lei, N. Saunshi, and J. Zhuo. Predicting what you already know helps: Provable selfsupervised learning. arXiv preprint arXiv:2008.01064, 2020.

J. Song and S. Ermon. Multi-label contrastive predictive coding. NeurIPS, 2020.

J. Wang, J. Jiao, and Y.-H. Liu. Self-supervised video representation learning by pace prediction. arXiv preprint arXiv:2008.05861, 2020.

J.B. Grill, F. Strub, F. Altché, C. Tallec, P. H. Richemond, E. Buchatskaya, C. Doersch, B. A. Pires, Z. D. Guo, M. G. Azar, et al. Bootstrap your own latent: A new approach to self- supervised learning. NeurIPS, 2020.

J.Xie, X. Zhan, Z. Liu, Y. S. Ong, and C. C. Loy. Delving into inter-image invariance for unsupervised visual representations. arXiv preprint arXiv:2008.11702, 2020.

K. He, G. Gkioxari, P. Dollár, and R. Girshick. Mask R-CNN]. In ICCV, 2017.

L. Gomez, Y. Patel, M. Rusiñol, D. Karatzas, and C. Jawahar. Self-supervised learning of visual features through embedding images into text topic spaces. In CVPR, 2017.

L. Tao, X. Wang, and T. Yamasaki. Self-supervised video representation learning using inter-intra contrastive framework. ACM Multimedia, 2020.

L. v. d. Maaten and G. Hinton. Visualizing data using t-sne. Journal of Machine Learning Research 9, 2008. Accessed Oct. 5, 2020. https://jmlr.org/papers/volume9/vandermaaten08a/vandermaaten08a.pdf.

M. Caron, I. Misra, J. Mairal, P. Goyal, P. Bojanowski, and A. Joulin. Unsupervised learning of visual features by contrasting cluster assignments. NeurIPS, 2020.

M. Kim, J. Tack, and S. J. Hwang. Adversarial self-supervised contrastive learning. NeurIPS, 2020.

M. Patacchiola and A. Storkey. Self-supervised relational reasoning for representation learning. In NeurIPS, 2020.

M. Patrick, Y. M. Asano, R. Fong, J. F. Henriques, G. Zweig, and A. Vedaldi. Multi-modal self-supervision from generalized data transformations. arXiv preprint arXiv:2003.04298, 2020.

M. Wu, C. Zhuang, M. Mosse, D. Yamins, and N. Goodman. On mutual information in contrastive learning for visual representations. arXiv preprint arXiv:2005.13149, 2020.

N. Srivastava, E. Mansimov, and R. Salakhudinov. Unsupervised learning of video representations using LSTMs. In ICML, 2015.

P. Bachman, R. D. Hjelm, and W. Buchwalter. Learning representations by maximizing mutual information across views. arXiv preprint arXiv:1906.00910, 2019.

P. Tokmakov, M. Hebert, and C. Schmid. Unsupervised learning of video representations via dense trajectory clustering. arXiv preprint arXiv:2006.15731, 2020.

P. Tschannen, J. Djolonga, P. K. Rubenstein, S. Gelly, and M. Lucic. On mutual information maximization for representation learning. ICLR, 2020.

Q. Cai, Y. Wang, Y. Pan, T. Yao, and T. Mei. Joint contrastive learning with infinite possibilities. In NeurIPS, 2020.

R. D. Hjelm and P. Bachman. Representation learning with video deep infomax. arXiv preprint arXiv:2007.13278, 2020.

R. D. Hjelm, A. Fedorov, S. Lavoie-Marchildon, K. Grewal, P. Bachman, A. Trischler, and Y. Bengio. Learning deep representations by mutual information estimation and maximization. In ICLR, 2019.

S. Löwe, P. O'Connor, and B. Veeling. Putting an end to end-to-end: Gradient-isolated learning of representations. In NeurIPS, 2019.

S. Purushwalkam and A. Gupta. Demystifying contrastive self-supervised learning: Invariances, augmentations and dataset biases. NeurIPS, 2020.

S.-A. Rebuffi, S. Ehrhardt, K. Han, A. Vedaldi, and A. Zisserman. Lsd-c: Linearly separable deep clusters. arXiv preprint arXiv:2006.10039, 2020.

T. Chen, S. Kornblith, K. Swersky, M. Norouzi, and G. Hinton. Big self-supervised models are strong semi-supervised learners. arXiv preprint arXiv:2006.10029, 2020.

T. Han, W. Xie, and A. Zisserman. Memory-augmented dense predictive coding for video representation learning. ECCV, 2020.

T.-Y. Lin, M. Maire, S. Belongie, J. Hays, P. Perona, D. Ramanan, P. Dollár, and C. L. Zitnick. Microsoft coco: Common objects in context. In ECCV, 2014.

W. Falcon and K. Cho. A framework for contrastive self-supervised learning and designing a new approach. arXiv preprint arXiv:2009.00104, 2020.

W. V. Gansbeke, S. Vandenhende, S. Georgoulis, M. Proesmans, and L. V. Gool. Scan: Learning to classify images without labels. ECCV, 2020.

W. Zheng, Z. Chen, J. Lu, and J. Zhou. Hardness-aware deep metric learning. In CVPR, 2019.

X. Chen and K. He. Exploring simple siamese representation learning. arXiv preprint arXiv:2011.10566, 2020.

(56) References Cited

OTHER PUBLICATIONS

X. Yan, I. Misra, A. Gupta, D. Ghadiyaram, and D. Mahajan. Clusterfit: Improving generalization of visual representations. In CVPR, 2020.

X. Zhan, J. Xie, Z. Liu, Y.-S. Ong, and C. C. Loy. Online deep clustering for unsupervised representation learning. In CVPR, 2020.

Y. Cao, Z. Xie, B. Liu, Y. Lin, Z. Zhang, and H. Hu. Parametric instance classification for unsupervised visual feature learning. In NeurIPS, 2020.

Y. Cheng, R. Wang, Z. Pan, R. Feng, and Y. Zhang. Look, listen, and attend: Co-attention network for self-supervised audio-visual representation learning. ACM Multimedia, 2020.

Y. Duan, W. Zheng, X. Lin, J. Lu, and J. Zhou. Deep adversarial metric learning. In CVPR, 2018.

Y. M. Asano, C. Rupprecht, and A. Vedaldi. Self-labelling via simultaneous clustering and representation learning. In ICLR, 2020.

Y. M. Asano, M. Patrick, C. Rupprecht, and A. Vedaldi. Labelling unlabelled videos from scratch with multi-modal self-supervision. In NeurIPS, 2020.

Y. Tian, L. Yu, X. Chen, and S. Ganguli. Understanding self-supervised learning with dual deep networks. arXiv preprint arXiv:2010.00578, 2020.

Y. Xiong, M. Ren, and R. Urtasun. Loco: Local contrastive representation learning. NeurIPS, 2020.

Y.-H. H. Tsai, Y. Wu, R. Salakhutdinov, and L.-P. Morency. Demystifying self-supervised learning: An information-theoretical framework. arXiv preprint arXiv:2006.05576, 2020.

Zhao, Z. Wu, R. W. Lau, and S. Lin. What makes instance discrimination good for transfer learning? arXiv preprint arXiv:2006.06606, 2020.

Arora, Sanjeev, Hrishikesh Khandeparkar, Mikhail Khodak, Orestis Plevrakis, and Nikunj Saunshi. 'A Theoretical Analysis of Contrastive Unsupervised Representation Learning', n.d., 10.

Asano, Yuki M, Christian Rupprecht, and Andrea Vedaldi. 'A Critical Analysis of Self-Supervision, or What We Can Learn From a Single Image', 2020, 16.

Caron, Mathilde, Piotr Bojanowski, Armand Joulin, and Matthijs Douze. 'Deep Clustering for Unsupervised Learning of Visual Features'. In *Computer Vision—ECCV 2018*, edited by Vittorio Ferrari, Martial Hebert, Cristian Sminchisescu, and Yair Weiss, 11218:139-56. Lecture Notes in Computer Science. Cham: Springer International Publishing, 2018. https://doi.org/10.1007/978-3-030-01264-9_9.

Caron, Mathilde, Piotr Bojanowski, Julien Mairal, and Armand Joulin. 'Unsupervised Pre-Training of Image Features on Non-Curated Data'. In *2019 IEEE/CVF International Conference on Computer Vision (ICCV)*, 2959-68. Seoul, Korea (South): IEEE, 2019. https://doi.org/10.1109/ICCV.2019.00305.

Chen, Ting, Simon Kornblith, Mohammad Norouzi, and Geoffrey Hinton. 'A Simple Framework for Contrastive Learning of Visual Representations'. *ArXiv:2002.05709 [Cs, Stat]*, Jun. 30, 2020. http://arxiv.org/abs/2002.05709.

Chen, Xinlei, Haoqi Fan, Ross Girshick, and Kaiming He. 'Improved Baselines with Momentum Contrastive Learning'. *ArXiv:2003.04297 [Cs]*, Mar. 9, 2020. http://arxiv.org/abs/2003.04297.

Doersch, Carl, Abhinav Gupta, and Alexei A. Efros. 'Unsupervised Visual Representation Learning by Context Prediction'. In *2015 IEEE International Conference on Computer Vision (ICCV)*, 1422-30. Santiago, Chile: IEEE, 2015. https://doi.org/10.1109/ICCV.2015.167.

Dosovitskiy, Alexey, Jost Tobias Springenberg, Martin Riedmiller, and Thomas Brox. 'Discriminative Unsupervised Feature Learning with Convolutional Neural Networks'. In *Advances in Neural Information Processing Systems 27*, edited by Z. Ghahramani, M. Welling, C. Cortes, N. D. Lawrence, and K. Q. Weinberger, 766-774. Curran Associates, Inc., 2014. http://papers.nips.cc/paper/5548-discriminative-unsupervised-feature-learning-with-convolutional-neural-networks.pdf.

Everingham, Mark, Luc Van Gool, C. K. I. Williams, J. Winn, and Andrew Zisserman. *The PASCAL Visual Object Classes (VOC) Challenge*, 2010.

Gidaris, Spyros, Praveer Singh, and Nikos Komodakis. 'Unsupervised Representation Learning by Predicting Image Rotations', 2018, 17.

Gontijo-Lopes, Raphael, Sylvia J. Smullin, Ekin D. Cubuk, and Ethan Dyer. 'Affinity and Diversity: Quantifying Mechanisms of Data Augmentation'. *ArXiv:2002.08973 [Cs, Stat]*, Jun. 4, 2020. http://arxiv.org/abs/2002.08973.

Harwood, Ben, Vijay Kumar B.G., Gustavo Carneiro, Ian Reid, and Tom Drummond. 'Smart Mining for Deep Metric Learning'. In *2017 IEEE International Conference on Computer Vision (ICCV)*, 2840-48. Venice: IEEE, 2017. https://doi.org/10.1109/ICCV.2017.307.

He, Kaiming, Haoqi Fan, Yuxin Wu, Saining Xie, and Ross Girshick. 'Momentum Contrast for Unsupervised Visual Representation Learning'. *ArXiv:1911.05722 [Cs]*, Mar. 23, 2020. http://arxiv.org/abs/1911.05722.

Khosla, Prannay, Piotr Teterwak, Chen Wang, Aaron Sarna, Yonglong Tian, Phillip Isola, Aaron Maschinot, Ce Liu, and Dilip Krishnan. 'Supervised Contrastive Learning'. *ArXiv:2004.11362 [Cs, Stat]*, Apr. 23, 2020. http://arxiv.org/abs/2004.11362.

Ko, Byungsoo, and Geonmo Gu. 'Embedding Expansion: Augmentation in Embedding Space for Deep Metric Learning'. *ArXiv:2003.02546 [Cs]*, Apr. 23, 2020. http://arxiv.org/abs/2003.02546.

Kolesnikov, Alexander, Xiaohua Zhai, and Lucas Beyer. 'Revisiting Self-Supervised Visual Representation Learning'. In *2019 IEEE/CVF Conference on Computer Vision and Pattern Recognition (CVPR)*, 1920-29. Long Beach, CA, USA: IEEE, 2019. https://doi.org/10.1109/CVPR.2019.00202.

Li, Junnan, Pan Zhou, Caiming Xiong, Richard Socher, and Steven C. H. Hoi. 'Prototypical Contrastive Learning of Unsupervised Representations'. *ArXiv:2005.04966 [Cs]*, Jul. 27, 2020. http://arxiv.org/abs/2005.04966.

Mishchuk, Anastasiia, Dmytro Mishkin, Filip Radenovic, and Jiri Matas. 'Working Hard to Know Your Neighbor\textquotesingle s Margins: Local Descriptor Learning Loss'. In *Advances in Neural Information Processing Systems 30*, edited by I. Guyon, U. V. Luxburg, S. Bengio, H. Wallach, R. Fergus, S. Vishwanathan, and R. Garnett, 4826-4837. Curran Associates, Inc., 2017. http://papers.nips.cc/paper/7068-working-hard-to-know-your-neighbors-margins-local-descriptor-learning-loss.pdf.

Misra, Ishan, and Laurens van der Maaten. 'Self-Supervised Learning of Pretext-Invariant Representations'. *ArXiv:1912.01991 [Cs]*, Dec. 4, 2019. http://arxiv.org/abs/1912.01991.

Noroozi, Mehdi, and Paolo Favaro. 'Unsupervised Learning of Visual Representations by Solving Jigsaw Puzzles'. *ArXiv:1603.09246 [Cs]*, Mar. 30, 2016. http://arxiv.org/abs/1603.09246.

Oord, Aaron van den, Yazhe Li, and Oriol Vinyals. 'Representation Learning with Contrastive Predictive Coding'. *ArXiv:1807.03748 [Cs, Stat]*, Jul. 10, 2018. http://arxiv.org/abs/1807.03748.

Ren, Shaoqing, Kaiming He, Ross Girshick, and Jian Sun. 'Faster R-CNN: Towards Real-Time Object Detection with Region Proposal Networks'. In *Advances in Neural Information Processing Systems 28*, edited by C. Cortes, N. D. Lawrence, D. D. Lee, M. Sugiyama, and R. Garnett, 91-99. Curran Associates, Inc., 2015. http://papers.nips.cc/paper/5638-faster-r-cnn-towards-real-time-object-detection-with-region-proposal-networks.pdf.

Russakovsky, Olga, Jia Deng, Hao Su, Jonathan Krause, Sanjeev Satheesh, Sean Ma, Zhiheng Huang, et al. 'ImageNet Large Scale Visual Recognition Challenge'. *ArXiv:1409.0575 [Cs ]*, Jan. 29, 2015. http://arxiv.org/abs/1409.0575.

Shen, Zhiqiang, Zechun Liu, Zhuang Liu, Marios Savvides, and Trevor Darrell. 'Rethinking Image Mixture for Unsupervised Visual Representation Learning'. *ArXiv:2003.05438 [Cs, Eess]*, Mar. 11, 2020. http://arxiv.org/abs/2003.05438.

Simo-Serra, Edgar, Eduard Trulls, Luis Ferraz, Iasonas Kokkinos, Pascal Fua, and Francesc Moreno-Noguer. 'Discriminative Learning of Deep Convolutional Feature Point Descriptors'. In *2015 IEEE International Conference on Computer Vision (ICCV)*, 118-26. Santiago, Chile: IEEE, 2015. https://doi.org/10.1109/ICCV.2015.22.

(56) References Cited

OTHER PUBLICATIONS

Tian, Yonglong, Chen Sun, Ben Poole, Dilip Krishnan, Cordelia Schmid, and Phillip Isola. 'What Makes for Good Views for Contrastive Learning'. *ArXiv:2005.10243* [Cs], May 20, 2020. http://arxiv.org/abs/2005.10243.

Tian, Yonglong, Dilip Krishnan, and Phillip Isola. 'Contrastive Multiview Coding'. *ArXiv:1906.05849* [Cs], Jun. 13, 2019. http://arxiv.org/abs/1906.05849.

Verma, Vikas, Alex Lamb, Christopher Beckham, Amir Naja?, Ioannis Mitliagkas, David Lopez-Paz, and Yoshua Bengio. 'Manifold Mixup: Better Representations by Interpolating Hidden States', n.d., 10.

Verma, Vikas, Alex Lamb, Juho Kannala, Yoshua Bengio, and David Lopez-Paz. 'Interpolation Consistency Training for Semi-Supervised Learning'. *ArXiv: 1903.03825* [Cs, Stat], Mar. 9, 2019. http://arxiv.org/abs/1903.03825.

Walawalkar, Devesh, Zhiqiang Shen, Zechun Liu, and Marios Savvides. 'Attentive CutMix: An Enhanced Data Augmentation Approach for Deep Learning Based Image Classification'. *ArXiv:2003.13048* [Cs], Apr. 5, 2020. http://arxiv.org/abs/2003.13048.

Wang, Tongzhou, and Phillip Isola. 'Understanding Contrastive Representation Learning through Alignment and Uniformity on the Hypersphere'. *ArXiv:2005. 10242* [Cs, Stat], Aug. 24, 2020. http://arxiv.org/abs/2005.10242.

Wu, Chao-Yuan, R. Manmatha, Alexander J. Smola, and Philipp Krahenbuhl. 'Sampling Matters in Deep Embedding Learning'. In *2017 IEEE International Conference on Computer Vision (ICCV)*, 2859-67. Venice: IEEE, 2017. https://doi.org/10.1109/ICCV.2017.309.

Wu, Zhirong, Yuanjun Xiong, Stella X. Yu, and Dahua Lin. 'Unsupervised Feature Learning via Non-Parametric Instance Discrimination'. In *2018 IEEE/CVF Conference on Computer Vision and Pattern Recognition*, 3733-42. Salt Lake City, UT: IEEE, 2018. https://doi.org/10.1109/CVPR.2018.00393.

Yannis Kalantidis, Mert Bulent Sariyildiz, Noe Pion, Philippe Weinzaepfel, Diane Larlus, "Hard Negative Mixing for Contrastive Learning", 34th Conference on Neural Information Processing Systems (NeurIPS 2020), Vancouver, Canada. arXiv:2010.01028v2; Dec. 4, 2020.

Yun, Sangdoo, Dongyoon Han, Sanghyuk Chun, Seong Joon Oh, Youngjoon Yoo, and Junsuk Choe. 'CutMix: Regularization Strategy to Train Strong Classifiers With Localizable Features'. In *2019 IEEE/CVF International Conference on Computer Vision (ICCV)*, 6022-31. Seoul, Korea (South): IEEE, 2019. https://doi.org/10.1109/ICCV.2019.00612.

Zhang, Hongyi, Moustapha Cisse, Yann N Dauphin, and David Lopez-Paz. 'Mixup: Beyond Empirical Risk Minimization', 2018, 13.

Zhuang, Chengxu, Alex Zhai, and Daniel Yamins. 'Local Aggregation for Unsupervised Learning of Visual Embeddings'. In *2019 IEEE/CVF International Conference on Computer Vision (ICCV)*, 6001-11. Seoul, Korea (South): IEEE, 2019. https://doi.org/10.1109/ICCV.2019.00610.

\* cited by examiner

UNSUPERVISED CONTRASTIVE LEARNING OF VISUAL REPRESENTATIONS USING NEGATIVE MIXING

CROSS-REFERENCE TO RELATED APPLICATIONS

This application claims the benefit of U.S. Provisional Application No. 63/086,645 filed on Oct. 2, 2020. The entire disclosure of the application referenced above is incorporated herein by reference.

FIELD

The present disclosure relates to computer vision systems and more particularly to systems and methods for training models using contrastive learning and hard negative mixing.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are mobile robots that may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants from a pickup to a destination. Another example of a navigating robot is a robot used to perform one or more functions inside a residential space (e.g., a home).

SUMMARY

In a feature, a training system includes: an encoder module configured to receive a query image and to generate a first vector representative of one or more features in the query image using an encoder; a mixing module configured to generate a second vector by mixing a third vector, representative of one or more features in a second image that is classified as a negative relative to the query image, with a fourth vector; and an adjustment module configured to train the encoder by selectively adjusting one or more parameters of the encoder based on the first vector and the second vector.

In further features, the mixing module is configured to use the first vector as the fourth vector.

In further features, the fourth vector is representative of one or more features in a third image that is classified as a negative relative to the query image.

In further features, the training system further includes: a first normalization module configured to normalize the first vector; and a second normalization module configured to normalize the second vector.

In further features: the first normalization module is configured to normalize the first vector using L2 normalization; and the second normalization module is configured to normalize the second vector using L2 normalization.

In further features, the encoder includes a convolutional neural network (CNN).

In further features, the second vector includes a convex linear combination of the third vector and the fourth vector.

In further features, the training system further includes a negative module configured to selectively classify the second image as a negative relative to the query image.

In further features, the training system further includes a similarity module configured to generate a similarity value based on the first vector and the second vector, where the negative module is configured to classify the second image as a negative relative to the query image based on the similarity value.

In further features, the training system further includes a similarity module configured to generate a similarity value based on the first vector and the second vector, where the negative module is configured to classify the second image as a negative relative to the query image when the similarity value is less than a predetermined value.

In further features, the training system further includes a similarity module configured to generate a similarity value based on the first vector and the second vector, where the negative module is configured to classify the second image as a negative relative to the query image when the similarity value is greater than a predetermined value.

In further features, the similarity module is configured to generate the similarity value by multiplying the first vector with the second vector.

In further features, the second image is one of the X images of a set of training images that are most similar to the query image, wherein X is an integer greater than or equal to 1.

In further features, the second image is classified as a hard negative relative to the query image.

In further features, the training system further includes: a similarity module configured to generate a similarity value based on the first vector and the second vector; and a negative module configured to classify the second image as a hard negative relative to the query image based on the similarity value.

In further features, no text descriptive of the query image or the second image is stored in memory.

In a feature, a navigating robot includes: a camera configured to capture images; a feature module including an encoder trained by the training system and configured to: receive an image from the camera; and generate a fifth vector representative of one or more features in the image using the encoder; and a control module configured to selectively actuate at least one propulsion device based on the fifth vector.

In a feature, a training system includes: a means for: receiving a query image; and generating a first vector representative of one or more features in the query image using an encoder; a means for generating a second vector by mixing a third vector, representative of one or more features in a second image that is classified as a negative relative to the query image, with a fourth vector; and a means for training the encoder by selectively adjusting one or more parameters of the encoder based on the first vector and the second vector.

In a feature, a training method includes: by one or more processors, receiving a query image; by the one or more processors, generating a first vector representative of one or more features in the query image using an encoder; by the one or more processors, generating a second vector by mixing a third vector, representative of one or more features in a second image that is classified as a negative relative to the query image, with a fourth vector; and by the one or more processors, training the encoder by selectively adjusting one or more parameters of the encoder based on the first vector and the second vector.

In further features: the second image is classified as a hard negative relative to the query image; and the training method further includes: by the one or more processors, generating a similarity value based on the first vector and the second vector; and by the one or more processors, classifying the second image as a hard negative relative to the query image based on the similarity value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Contrastive learning may be effective for self-supervised learning (SSL) approaches for computer vision and other technologies. Self-supervised learning may also be referred to as unsupervised learning. Contrastive learning involves training a model to embed two augmented versions of the same image close to each other and to push the embeddings of different images apart.

The present application involves using mixing of hard negatives to create synthesized hard negatives in the contrastive learning. A first strategy involves creating synthetic hard negatives by combining pairs of hard negatives for a given query. A second strategy involves mixing the query itself with a hard negative for the query. These hard negative mixing procedures improve the quality of visual representations learned. This allows for a smaller batch size of training images or a smaller memory bank. This also allows for better scalability. Hard negative mixing may include adding to a training set falsely detected positives as negative examples, thereby allowing any robot (or model it employs) trained using the updated training set to benefit from the additional knowledge.

Figure 1:
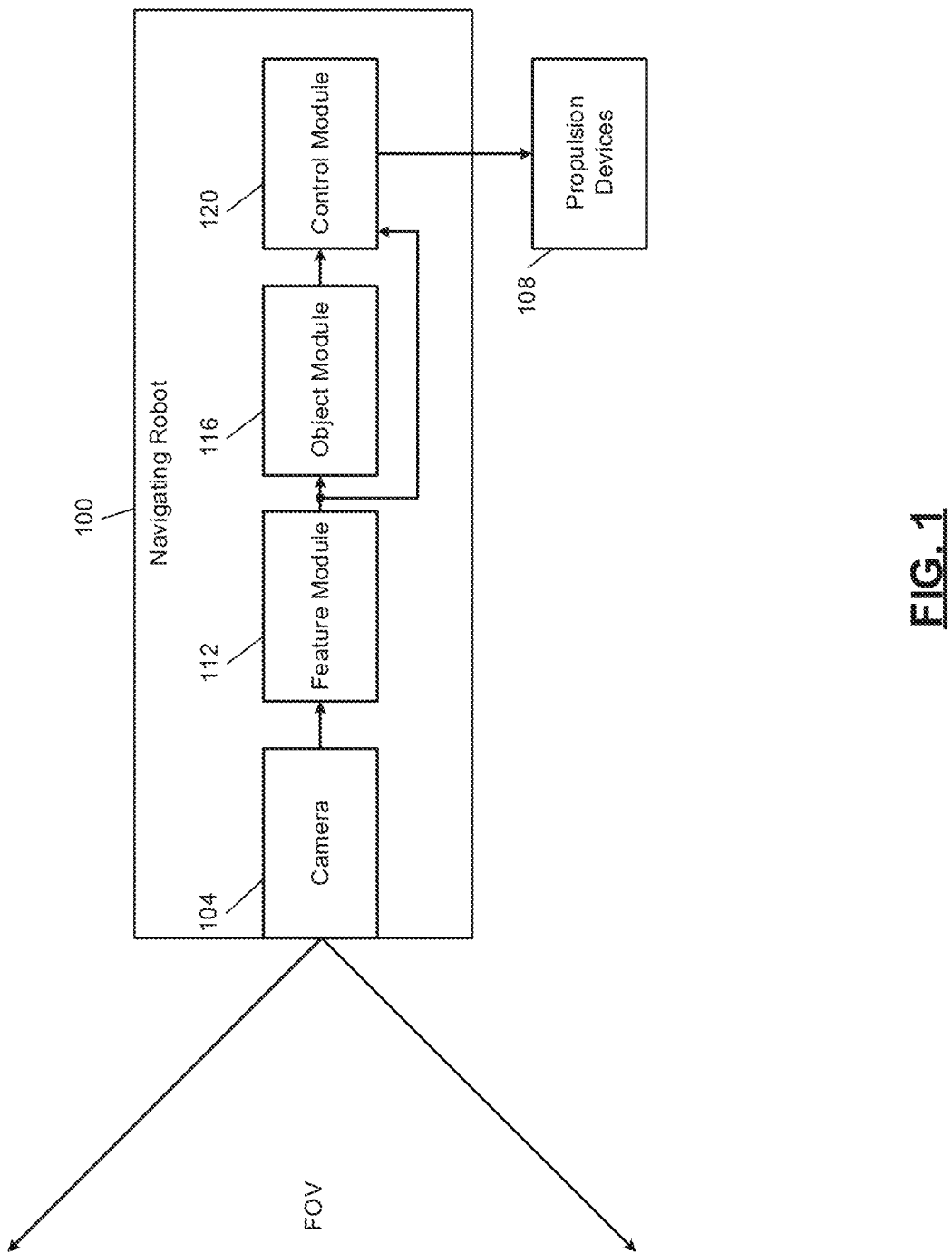
FIG. 1 is a functional block diagram of an example implementation of a navigating robot.

FIG. 1 is a functional block diagram of an example implementation of a navigating robot 100. The navigating robot 100 is a vehicle. The navigating robot 100 includes a camera 104 that captures images within a predetermined field of view (FOV). The predetermined FOV may be less than 360 degrees around the navigating robot 100. The operating environment of the navigating robot 100 may be an indoor space (e.g., a building), an outdoor space, or both indoor and outdoor space.

The camera 104 may be, for example, a grayscale camera, a red, green, blue (RGB) camera, or another suitable type of camera. In various implementations, the camera 104 may not capture depth (D) information, such as in the example of a grayscale-D camera or a RGB-D camera. The camera 104 may be fixed to the navigating robot 100 such that the orientation of the camera 104 relative to the navigating robot 100 remains constant. The camera 104 may update (capture images) at a predetermined frequency, such as 60 hertz (Hz), 120 Hz, or another suitable frequency.

The navigating robot 100 includes one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly.

A feature module 112 is trained to identify features (visual features) in the images. The feature module 112 generates feature vector representations based on the images, as discussed further below. The feature module 112 is trained using contrastive learning and hard negatives, as discussed further below. An object module 116 identifies objects in the images based on the feature vector representations.

A control module 120 is configured to control the propulsion devices 108 to navigate, such as from a starting location to a goal location, based on one or more features and/or one or more objects. For example, the control module 120 may determine an action to be taken by the navigating robot 100 based on one or more features and/or one or more objects. For example, the control module 120 may actuate the propulsion devices 108 to move the navigating robot 100 forward by a predetermined distance under some circumstances based on one or more features and/or one or more objects. The control module 120 may actuate the propulsion devices 108 to move the navigating robot 100 backward by a predetermined distance under some circumstances based on one or more features and/or one or more objects. The control module 120 may actuate the propulsion devices 108 to turn the navigating robot 100 to the right by the predetermined angle under some circumstances based on one or more features and/or one or more objects. The control module 120 may actuate the propulsion devices 108 to turn the navigating robot 100 to the left by the predetermined angle under some circumstances based on one or more features and/or one or more objects. The control module 120 may not actuate the propulsion devices 108 to not move the navigating robot 100 under some circumstances based on the based on one or more features and/or one or more objects. The control module 120 may actuate the propulsion devices 108 to move the navigating robot 100 upward under some circumstances based on one or more features and/or one or more objects. The control module 120 may actuate the propulsion devices 108 to move the navigating robot 100 downward under some circumstances based on one or more features and/or one or more objects.

While the example of the navigating robot 100 is provided, the feature module 112 trained as discussed herein may be used in one or more other implementations and/or fields. For example, the feature module 112 may be used in computer vision, image searching, moderation, and/or one or more other environments and/or fields. In the example of moderation, for example, the feature module 112 may be used to identify features in an image to be posted (or posted) to a website. A moderation module may remove an image from the website or block it from being posted to the website based on the features.

Figure 2:
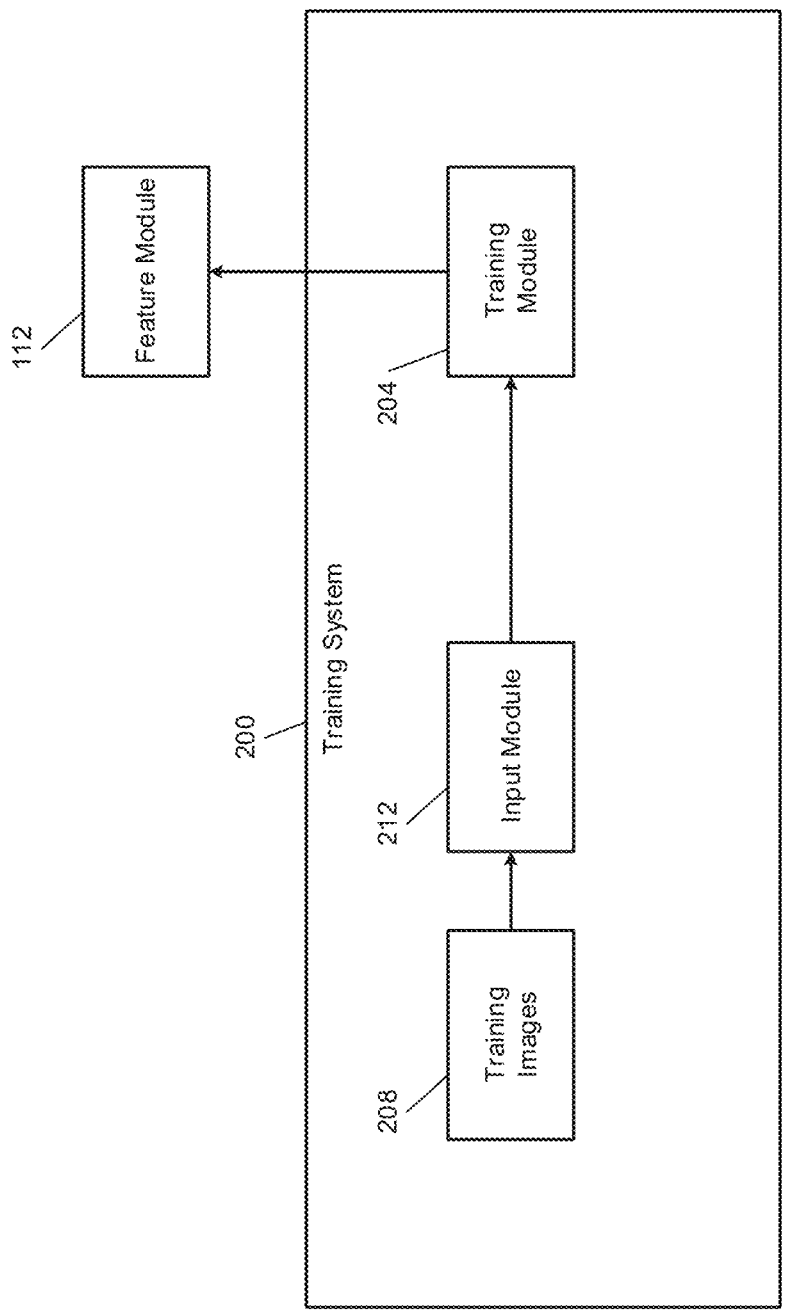
FIG. 2 includes a functional block diagram of an example training system.

FIG. 2 includes a functional block diagram of an example training system 200 that trains the feature module 112, such as used by the navigating robot 100. A training module 204 trains the feature module 112 using a set of training images 208 stored in memory. An input module 212 selects ones of the training images 208 and inputs the selected ones of the training images 208 to the training module 204.

The training images 208 do not have labels. The training is therefore self-supervised. Supervised training involves images with labels. The label of an image may include text descriptive of one or more features or objects in the image. In other words, supervised training relies on annotations provided together with the images. Annotations may correspond to image labels (e.g., tags describing the presence of some object categories or some other properties).

Contrastive learning may be effective for self-supervised learning (SSL) approaches for computer vision and other technologies. Using contrastive learning, by learning to embed two augmented versions of the same image close to each other and to push the embeddings of different images apart, one can train highly transferable visual representations. Heavy data augmentation, which provides models with diverse examples, may be helpful to learning such representations. Heavy data augmentation, however, may add significant computational cost.

Hard negatives may aid in contrastive learning. Some contrastive SSL approaches may increase the batch size of training images or keep a large memory bank. This may have a negative impact on scalability.

The present application involves hard negative mixing at the feature level. This can be considered data augmentation applied directly in the embedding space. The following two strategies generate, for each query, new hard negative samples on-the-fly, which results in minimal computational overhead. A first strategy involves the training module 204 creating synthetic hard negatives by combining pairs of hardest negatives for a given query. A second strategy involves the training module 204 mixing the query itself with one of the hardest negatives for the query. These hard negative mixing procedures improve the quality of visual representations learned.

SSL enables the use of non-curated training images and video collections for learning visual representations from scratch. This means that training can be performed using visual data without the need for labels or annotations beyond their visual content itself (i.e., the images or video). This makes such approaches ideal for exploring raw and unknown data.

Central to computer vision may be learning better visual representations from visual data alone (without labels). Those representations can be either specialized for a specific task, or more task-independent and generalizable to multiple tasks. SSL can help in both cases: by learning representations that are easily tuned for multiple tasks and datasets, SSL can help specialized models learn better representations for their specific task when only a smaller amount of clean data exists.

The SSL of the present application involves contrastive learning, for example, trying to bring the embeddings of two transformed versions of the same image (positive pair) close to each other and further apart from the embedding of any other image (negatives) using a contrastive loss. The choice of the negative samples may be important: if negatives are too easy, a trained model may not learn meaningful visual representations.

To have access to more challenging negative samples, the batch size may be increased or a large memory bank of training images may be used in order to improve the quality of negatives. These strategies lead to hard negatives and enable both better representations and faster learning. However, increasing the size of the memory bank too much leads to diminishing returns in terms of performance.

The present application provides contrastive learning with harder negatives, without increasing the size of the memory bank, and without increasing the computational or memory costs. Hard (e.g., the hardest) negatives are used for each query positive pair, and mix or synthesize more hard negatives by creating convex combinations of the negatives. The present application involves mixing directly at the feature level in the embedding space. This allows for those negatives to be computed on-the-fly with minimal computational overhead.

The hard negative mixing discussed herein changes the hardness of the proxy task from the side of the negatives. By mixing harder negatives the present application learns a more uniform embedding space and highly transferable representations.

The right set of transformations provides more diverse, i.e. more challenging, copies of the same image to the model and makes the self-supervised (proxy) task harder. At the same time, data mixing techniques operating at either the pixel or, more efficiently, at the feature-level in the embedding space, help the model learn more robust features and improve both supervised and semi-supervised learning tasks. Harder negatives may facilitate better and faster learning.

Figure 3:
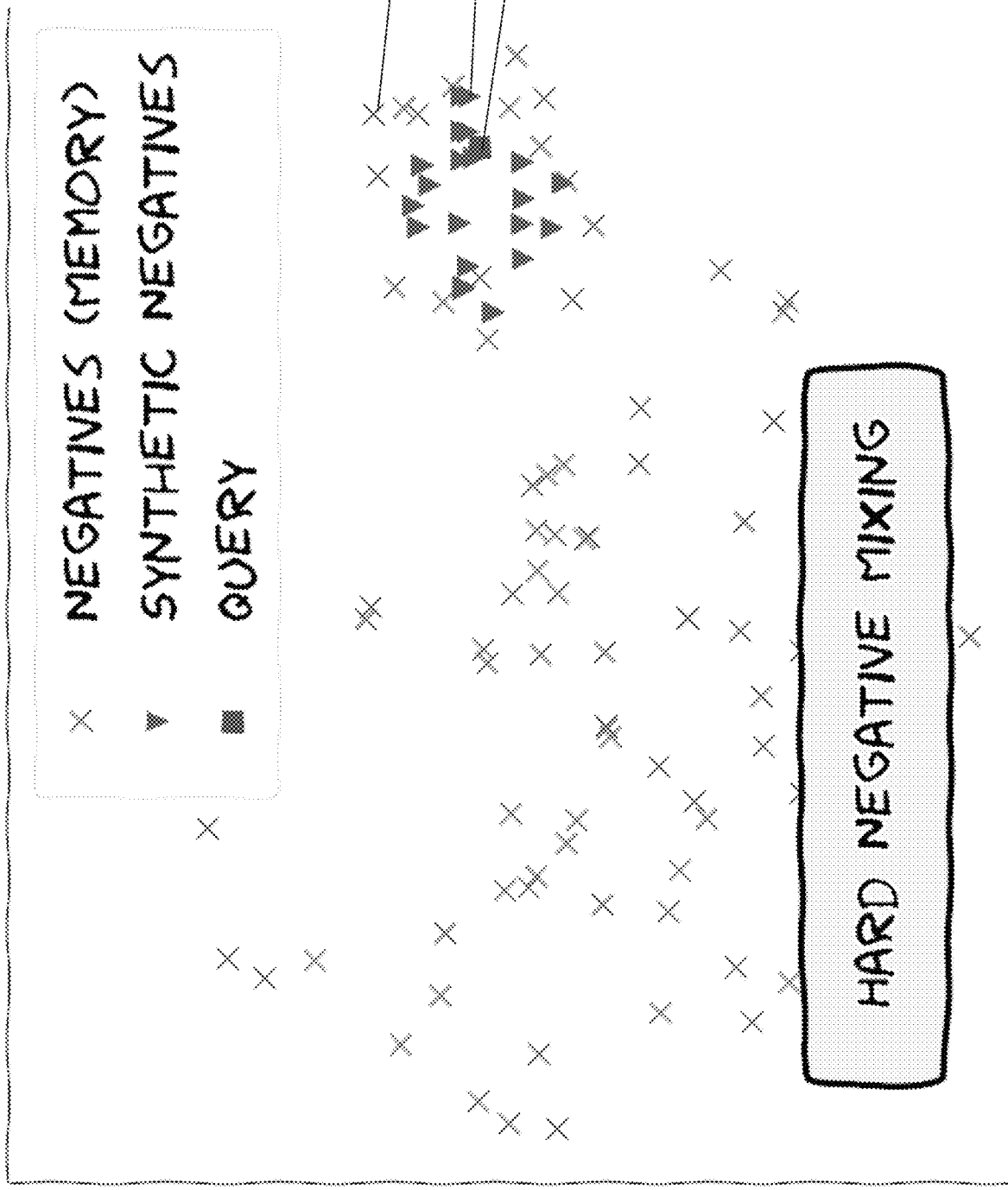
FIG. 3 is an example t-SNE plot after training.

FIG. 3 is an example t-SNE plot after training using 32-dimensional random embeddings on a unit hypersphere. A query (square) is illustrated at 304. The memory Xs 308 includes some easy negatives and some hard negatives. Many of the negatives (the easy negatives) are too far from the query to contribute to the contrastive loss. The present application involves mixing only ones of the hardest negatives (based on their similarity to the query) to synthesize new hard but more diverse negative points. These are illustrated by triangles 312. In various implementations, all images may be considered negatives negatives to each other. In other words, negatives may be images that are not transformed versions of the query.

The present application involves hard negative mixing meaning synthesizing hard negatives directly in the embedding space, on-the-fly during the training, and adapted to each positive query. Pairs of the hardest existing negatives, as well as mixing hard negatives with the query itself. Hard negative mixing improves both the generalization of the visual representations learned (e.g., measured via their transfer learning performance), as well the utilization of the embedding space, for a wide range of hyperparameters. Training can also be faster using less epochs. Also, there is no need for labels (annotations) and no selection for negatives is made. Only samples of a single random interpolation between multiple pairs may be used in various implementations. Beyond mixing negatives, the present application involves mixing positive with negative features to get even harder negatives and to achieve improved performance.

Figure 4:
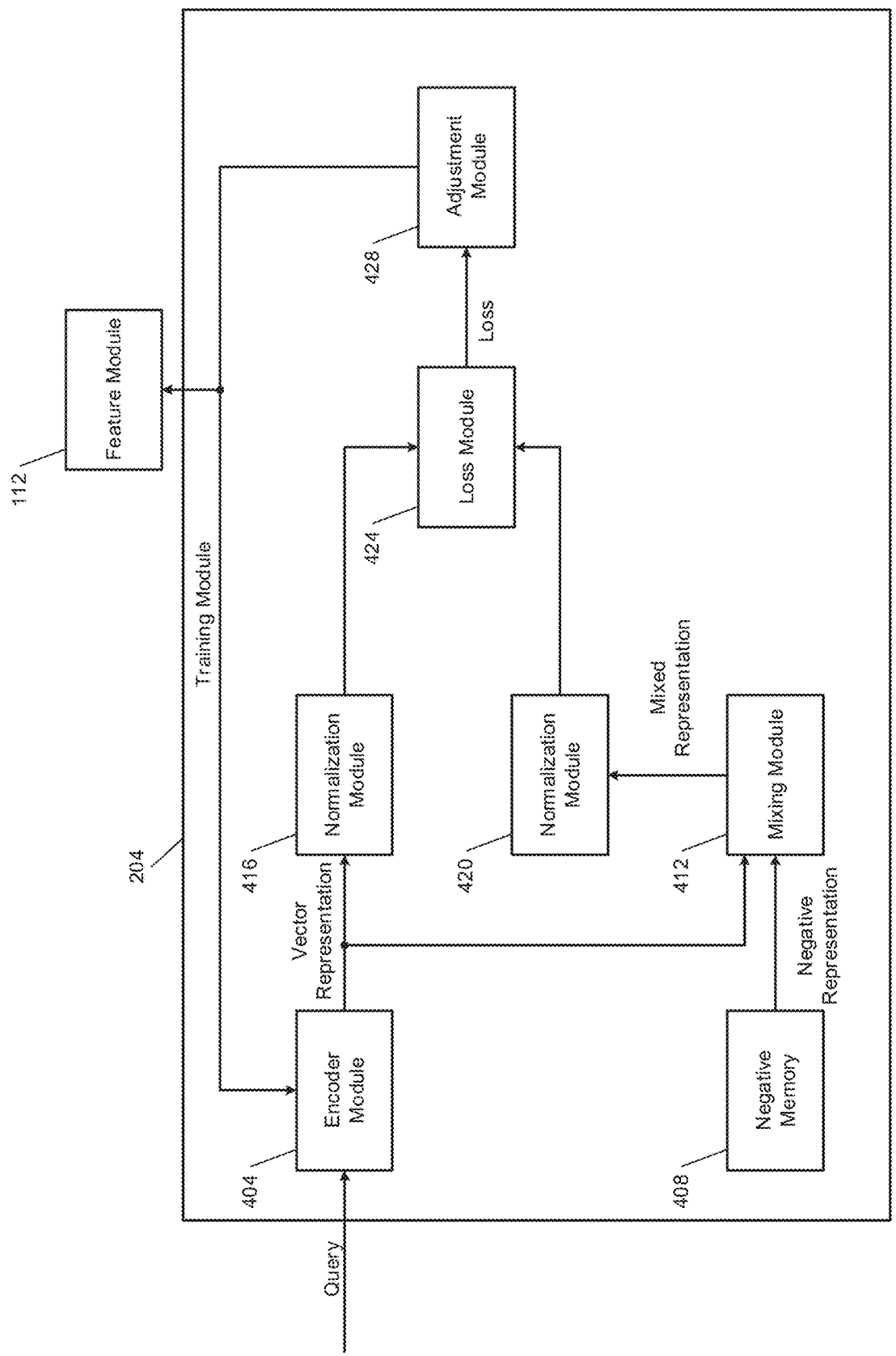
FIG. 4 is a functional block diagram of an example implementation of a training module.

FIG. 4 is a functional block diagram of an example implementation of the training module 204. An encoder module 404 encodes (embeds) a query (image or portion of an image) into a (feature) vector representation of the query. The vector representation is a vector representative of features in the query. The encoder 404 may include, for example, a convolutional neural network (CNN) or another suitable type of encoder configured to generate vector representations of features in queries (images). The encoder 404 may have the same structure (e.g., including the CNN) as the feature module 112. As such, after training, the characteristics of the encoder module 404 may be stored to the feature module 112 for use.

Vector representations of negatives (negative vector representations) of the query are stored in negative memory 408. Negatives are determined based on, for example, having a similarity (value) with the query that is less than a predetermined value or in another suitable manner. Similarity values are discussed further below.

A mixing module 412 generates mixed (feature) vector representations. For example, at some times the mixing module 412 may generate a mixed vector representation based on two of the negative vector representations. Additionally or alternatively, the mixing module 412 may generate a mixed vector representation based on the vector representation of the query and a negative vector representation.

A normalization module 416 may normalize the vector representation of the query. For example only, the normalization module 416 may normalize the vector representation using L2 normalization or another suitable type of normalization. A normalization module 420 may normalize the mixed vector representation. For example only, the normalization module 420 may normalize the mixed vector representation using L2 normalization or another suitable type of normalization. In various implementations, the normalization modules 416 and 420 may be omitted.

A loss module 424 determines a contrastive loss based on the (normalized or not normalized) vector representation and mixed vector representation. An example loss is discussed further below.

After a predetermined number of queries and mixed representations have been input (an epoch), an adjustment module 428 selectively adjusts the feature module 112 and the encoder module 404 based on the losses. The adjustment module 428 may adjust the feature module 112 and the encoder module 404 to minimize or decrease the loss. In various implementations, the functionality of the mixing module and the adjustment module 428 may be combined in one module. In various implementations, the encoder module 404 may be separate from the training module 204.

The feature module 112 generates the feature vector representations using the same encoder as the encoder module 404. Once a predetermined number of epochs have been performed or the loss is less than a predetermined value, the training of the feature module 112 may be complete. In various implementations, the characteristics of the feature module 112 may be stored after the training is complete.

Let f be an encoder, (e.g., a CNN for visual representation learning) that transforms an input image into an embedding (or feature) vector $z=f(x)$, $z \in \mathbb{R}^d$. Let q and k be embeddings and Q a negative feature memory bank (408) of size K, i.e. a set of K embeddings in $\mathbb{R}^d$. The loss function (used by the loss module 424) may be, for example:

$$\mathcal{L}_{q,k,Q} = -\log \frac{\exp\left(\frac{q^T k}{\tau}\right)}{\exp\left(\frac{q^T k}{\tau}\right) + \sum_{n \in Q} \exp\left(\frac{q^T n}{\tau}\right)}, \quad (1)$$

where $\tau$ is a predetermined temperature value. All of the embeddings may be normalized, as discussed above. $q^T k$ corresponds to the similarity between the query and a positive image, and $q^T n$ corresponds to the similarity between the query and a negative image. The query q and a key k form a positive pair, in contrast with every feature n in the bank of negatives Q, which may be referred to as a queue.

The query and the key may be the embeddings of two augmentations of the same image. The memory bank Q (408) includes negatives for each positive pair, and may be considered as an external memory including every other image in a dataset, a queue of the last batches, or every other image in a minibatch of the dataset.

The log-likelihood function of the equation above may be defined over the probability distribution created by applying a softmax function for each input/query q. Let $p_{zi}$ be the matching probability for the query and feature $z_i \in Z = \{Q, k\}$ then the gradient of the loss with respect to the query q is given by:

$$\frac{\partial \mathcal{L}_{q,k,Q}}{\partial q} = -\frac{1}{\tau}\left((1-p_k) \cdot k - \sum_{n \in Q} p_n \cdot n\right), \quad (2)$$

where $$p_{zi} = \frac{\exp\left(\frac{q^T z_i}{\tau}\right)}{\sum_{j \in Z} \exp\left(\frac{q^T z_j}{\tau}\right)},$$

and $p_k$ and $p_n$ are the matching probability of the key and negative feature $z_i=k$, $z_i=n$, respectively. The contributions of the positive and negative logits to the loss are identical to the ones for a (K+1)-way cross-entropy classification loss, where the logit for the key corresponds to the query's latent class and all gradients are scaled by $1/\tau$.

Having hard negatives may help provide better contrastive learning and training of the feature module 112. Sampling negatives from the same batch may lead to a need for larger batches while sampling negatives from a memory bank that contains every other image in the dataset requires the time consuming task of keeping a large memory up-to-date. In the latter case, a trade-off exists between the freshness of the memory bank representations and the computational overhead for re-computing them as the encoder keeps changing.

The Momentum Contrast (or MoCo) training features described herein offer a compromise between the two negative sampling extremes: it keeps a queue of the latest K features from the last batches, encoded with a second key encoder (the mixing module) that trails the (main/query) encoder (encoder module 404) with a much higher momentum. The key feature k and all features in Q are encoded with the key encoder (the mixing module 412). A baseline MoCo example is described in the document titled Momentum Contrast for Unsupervised Visual Representation learning, by Kaiming He, et al, arXiv preprint arXiv:1911.05722, of 2019, which is incorporated herein in its entirety.

Figure 5:
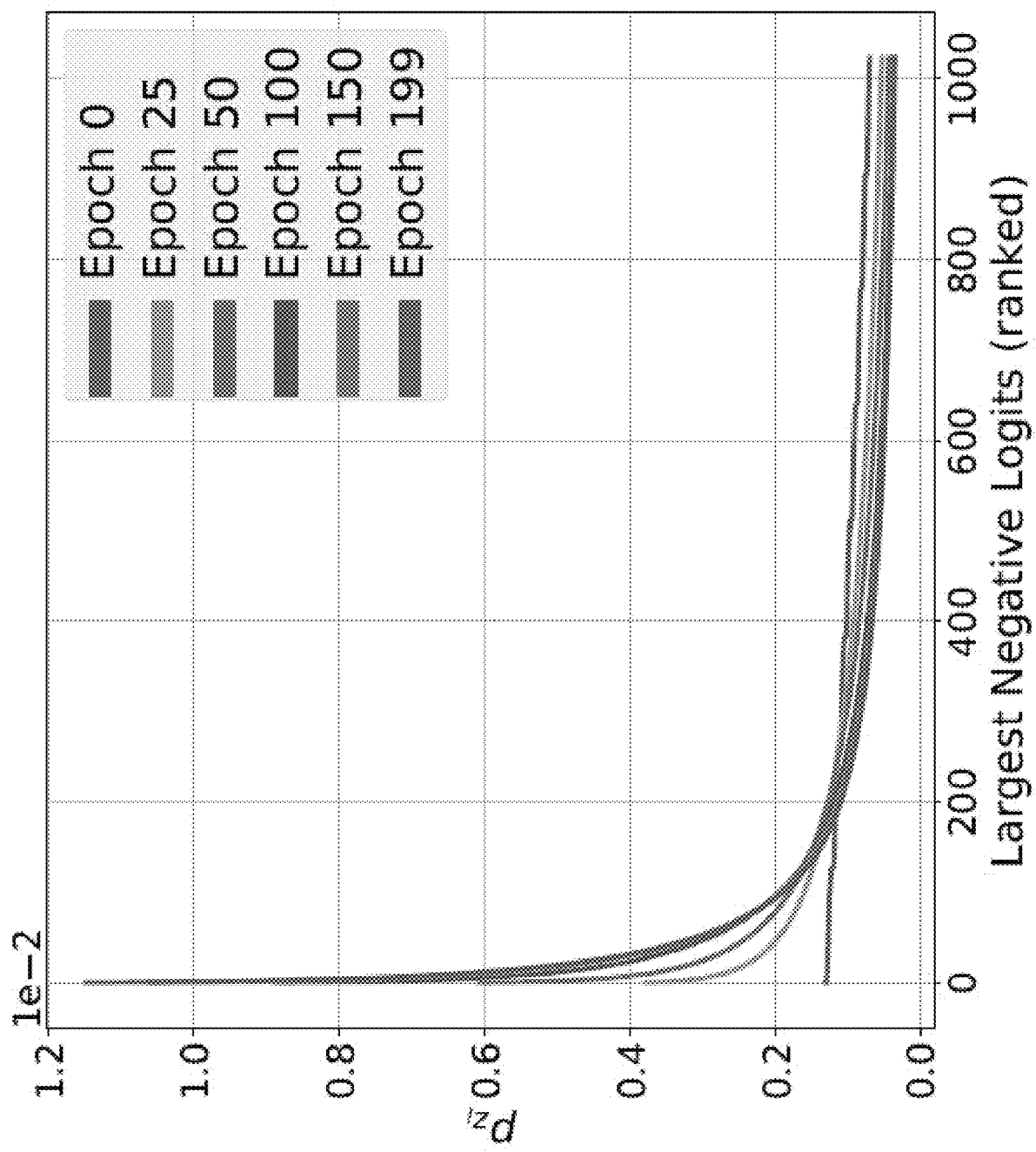
FIG. 5 is an example illustration of how hard the negatives are during training.

FIG. 5 is an example illustration of how hard the negatives are during training by plotting the highest 1024 matching probabilities pi for training images and a queue of size K=16 k. FIG. 5 illustrates that, although in the beginning of training (e.g., at or near at epoch 0) the logits are relatively flat. As training progresses, fewer and fewer negatives offer significant contributions to the loss. This shows that most of the memory negatives may not be helping the task.

Figure 6:
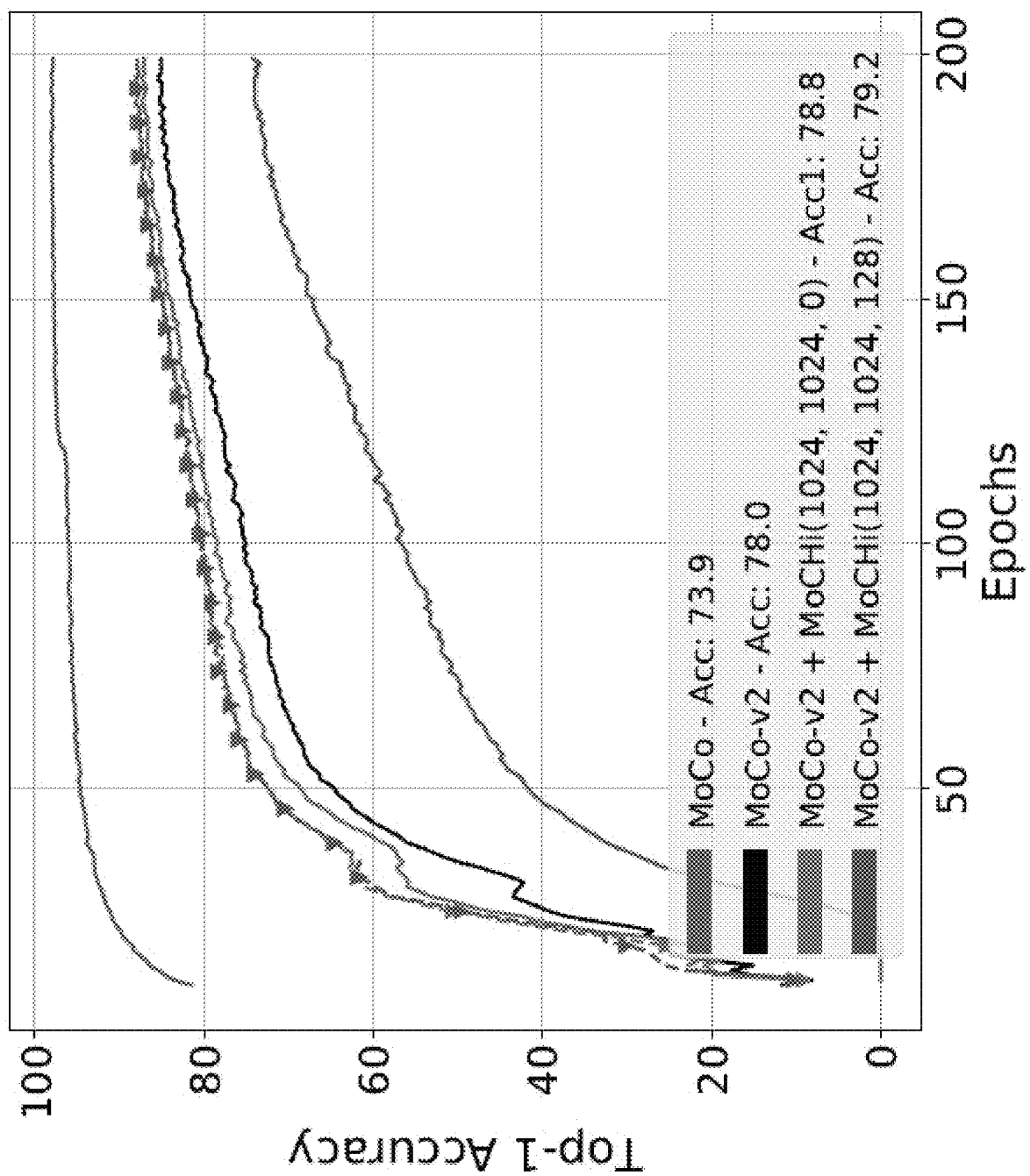
FIG. 6 visualizes a proxy task performance including the percentage of queries where the key is ranked over all negatives across training.

The hardness of the proxy task may be directly correlated with the difficulty of the transformations set. In other words, hardness may be modulated via the positive pair. FIG. 6 visualizes the proxy task performance, i.e. the percentage of queries where the key is ranked over all negatives across training. The training module 204 described herein achieves a performance gain by modulating the proxy task via mixing harder negatives.

Figure 7:
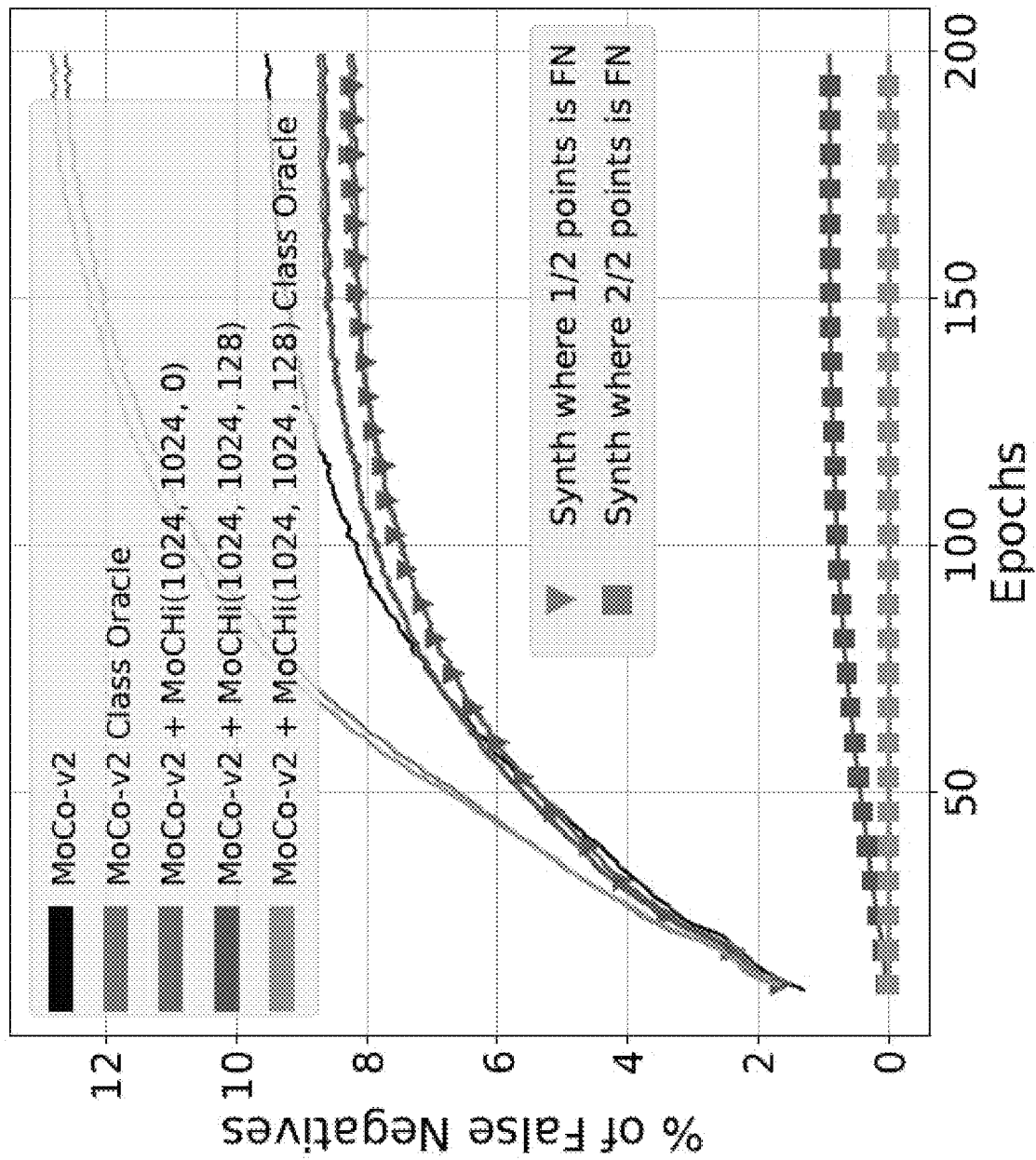
FIG. 7 illustrates the percentage of false negatives when looking at the highest negative logits during training.

False negatives (FN) may be all negative features in the memory Q that correspond to images of the same class as the query. The training module 204 may discard false negatives for the purposes of the mixing (and prevent mixing using false negatives). FIG. 7 illustrates the percentage of false negatives when looking at the highest 1024 negative logits during training. FIG. 7 illustrates that as representations get better more and more same-class logits are ranked among the top.

Presented herein is an approach for synthesizing hard negatives, i.e. by mixing some of the hardest negative features of the contrastive loss. The hard negative mixing described herein may be referred to as MoCHi, which may stand for Mixing of Contrastive Hard Instances.

The naming convention MoCHi (N, s, s') indicates the three hyperparameters defined below. Given a query q, its key k and negative/queue features n ∈ Q for a queue of size K, the loss for the query is composed of logits $l(z_1)=q^T z_i/\tau$ fed into a softmax function. Let $\tilde{Q}=\{n_1, \ldots, n_k\}$ be the ordered set of all negative features such that $l(n_i) > l(n_j)$, $\forall i<j$, the set of negative features sorted by decreasing similarity to the query feature.

For each query, the mixing module 412 synthesizes s synthetic hard negative features by creating convex linear combinations of pairs of the hardest negatives (or the query and a hard negative). The mixing module 412 may define the hardest negatives by truncating the ordered set $\tilde{Q}$ keeping the first N<K items. Formally, let H={h1, . . . , hs} be the set of synthetic points (hard negatives) to be generated. A synthetic point $h_k \in H$ is given as $$h_k = \frac{\tilde{h}_k}{\|\tilde{h}_k\|_2}, \quad (3)$$

where $\tilde{h}_k = \alpha_k n_i + (1-\alpha_k) n_j$. $n_i, n_j \in \widetilde{Q^N}$ are randomly chosen negative features from the set $\widetilde{Q^N} = \{n_1, \ldots, n_N\}$, $\alpha_k \in (0,1)$ is a randomly chosing mixing coefficient and $\|\cdot\|_2$ is the L2 norm. After mixing, the logits $l(h_k)$ are computed and added as further negative logits for query q. The process repeats to get hard negatives adapted around each query. Since all other logits $l(z_i)$ are already computed, the extra computational cost only involves computing s dot products between the query and the synthesized features.

The above involves creating hard negatives by convex combinations of existing negative features. If the normalization is omitted, the generated features will lie inside the convex hull of the hardest negatives. Early during training, where in most cases there is no linear separability of the query with the negatives, the synthesis may result in harder negatives. As training progresses, and assuming that linear separability is achieved, synthesizing features may not necessarily create negatives that are harder than the hardest one present. However, this does stretch the space around the query and push the memory negatives further and increasing uniformity of the space. The space stretching effect is also visible in the example of FIG. 3.

As stated above, the mixing module 412 may mix the query with hard negatives to get even harder negatives for the proxy task. The mixing module 412 may synthesize synthetic hard negative features for each query, by mixing its feature with a randomly chosen feature from a hard negative in set $\widetilde{Q^N}$. Let H'={h'$_1$, . . . , h'$_{s'}$} be the set of synthetic points to be generated by mixing the query and negatives. Similar to equation (3) above, the synthetic points $h'_k = \tilde{h}'/\|\tilde{h}'_k\|_2$ where $\tilde{h}_k = \beta_k q + (1-\beta_k) n_j$, and $n_j$ is a randomly chosen negative feature from $\tilde{Q}$ while $\beta_k \in (0, 0.5)$ is a randomly chosen mixing coefficient for the query. $\beta_k < 0.5$ may provide that the query's contribution is smaller than the contribution of the negative. The same for all synthetic features generated, logits $l(h'_k)$ are computed and added as further negative logits for query 1. The extra computational cost only involves computing s' dot products between the query and negatives. The computational overhead may be approximately equal to increasing the size of the memory bank (408) by s+s'<<K.

FIG. 6 illustrates that, for the case of mixing pairs of negatives, the learning resulting from the training is faster, but in the end the proxy task performance is similar to a baseline. As features converge, it can be seen that max $l(h_k)<$max $l(n_j)$, $h_k \in H$, $n_j \in \tilde{Q}^N$. This may not be the case, however, where negatives are synthesized by mixing a negative with the query. As shown in FIG. 6, near the end of the training, max $l(h'_k)>$max $l(n_j)$, $h'_k \in H'$, i.e., although final performance when discarding the synthetic negatives is similar to the baseline, when the synthetic negatives are taken into account, the final performance may be lower.

The training described herein modulates the hardness of the task through the hardness of the negatives.

In various implementations, if the training data includes labels, the training module 204 may include a classification and removal module that removes false negatives from the training data based on the classifications in the labels (annotations). The training described herein provides a higher upper bound than other training and closes a difference to the cross entropy upper bound by filtering the negatives.

Figure 8:
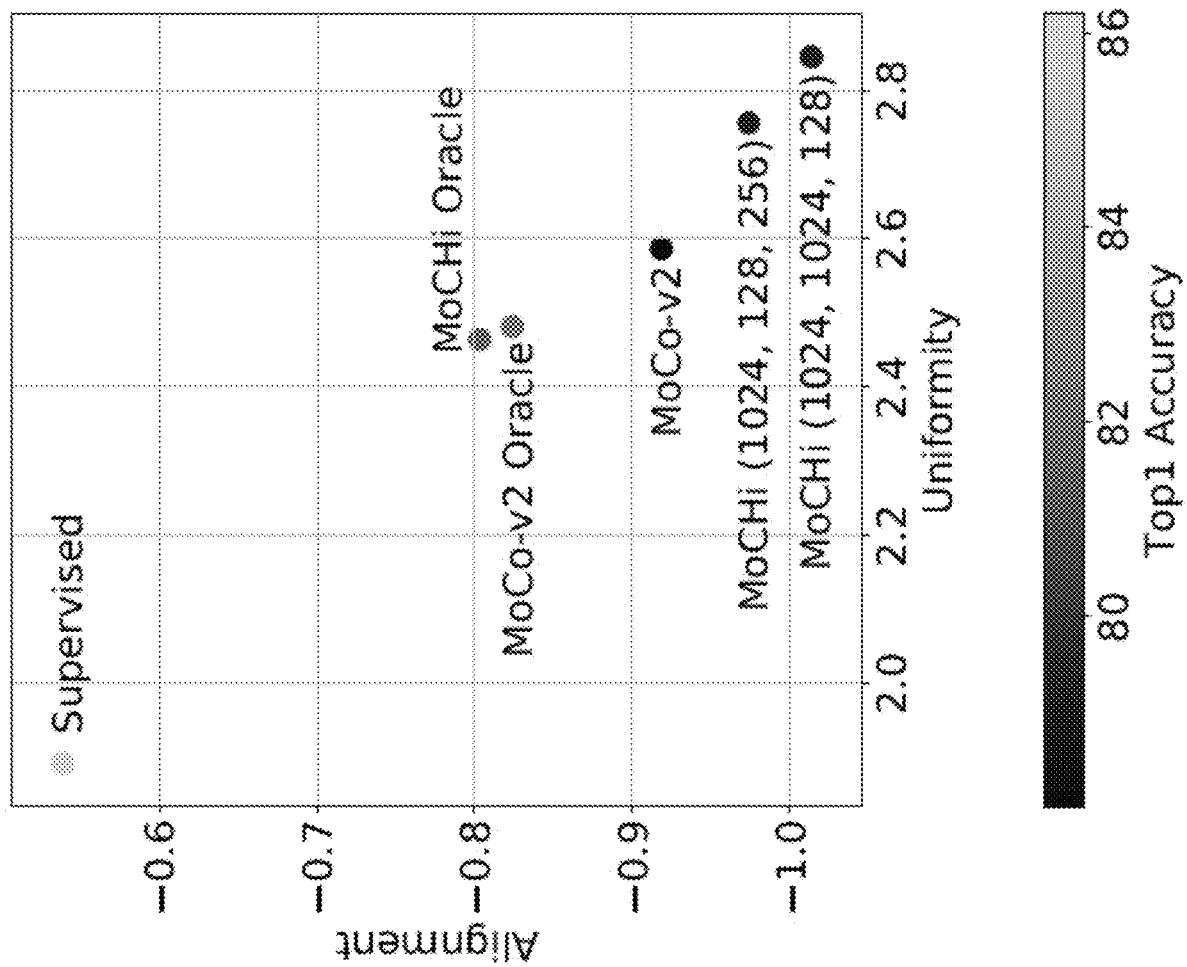
FIG. 8 includes a graph of the first and second measures for various types of training.

Two losses/metrics for assessing contrastive learning representations are as follows. The first measures alignment of the representation on the hypersphere, i.e., the absolute distance between representations with the same label. The second measures uniformity of the distribution on the hypersphere through measuring the logarithm of an average pairwise Gaussian potential between all embeddings. FIG. 8 includes a graph of the first and second measures for various types of training and the training of the present application (MoCHi). FIG. 8 illustrates that the training described herein allows the proxy task to learn to better utilize the embedding space.

In various implementations, the training module 204 may be implemented using 4 graphics processing unit (GPU) servers or another suitable type of server and/or processor. The training may be for 60 epochs, 100 epochs, or another suitable number of epochs. The training may be performed using an initial learning rate of 10.0, 30.0, or another suitable learning rate. The training may be performed using a batch size of 128 or 512 or another suitable batch size. In various implementations, a step learning rate schedule may be used that drops at predetermined epochs, such as 30, 40, and 50, or 60 and 80. The training may be performed using K=16 k, K=65 k, or K of another suitable size. A warm-up of 10, 15, or another suitable number of epochs may be used. During the warm-up, the training may be performed without synthesized hard negatives. In various implementations, the training may include not performing hyperparameter tuning for the object detection task. While example learning rates, batch sizes, step learning rate schedules, warm up sizes, and K values are provided, other suitable values may be used.

The training discussed herein provides consistent gains over a very high baseline for linear classification. The hard negative mixing approach improves the quality of representations learned in an unsupervised (self-supervised) way, offering better transfer learning performance as well as a better utilization of the embedding space. The learning/training is also able to learn generalizable representations faster. This is important given the high computational cost of SSL.

The hard negative mixing described above may help to design more fair representations. By producing embeddings that make a better use of the embedding space, features may be more separable, less clustered, and more easily disentangled across relevant latent axes.

Figure 9:
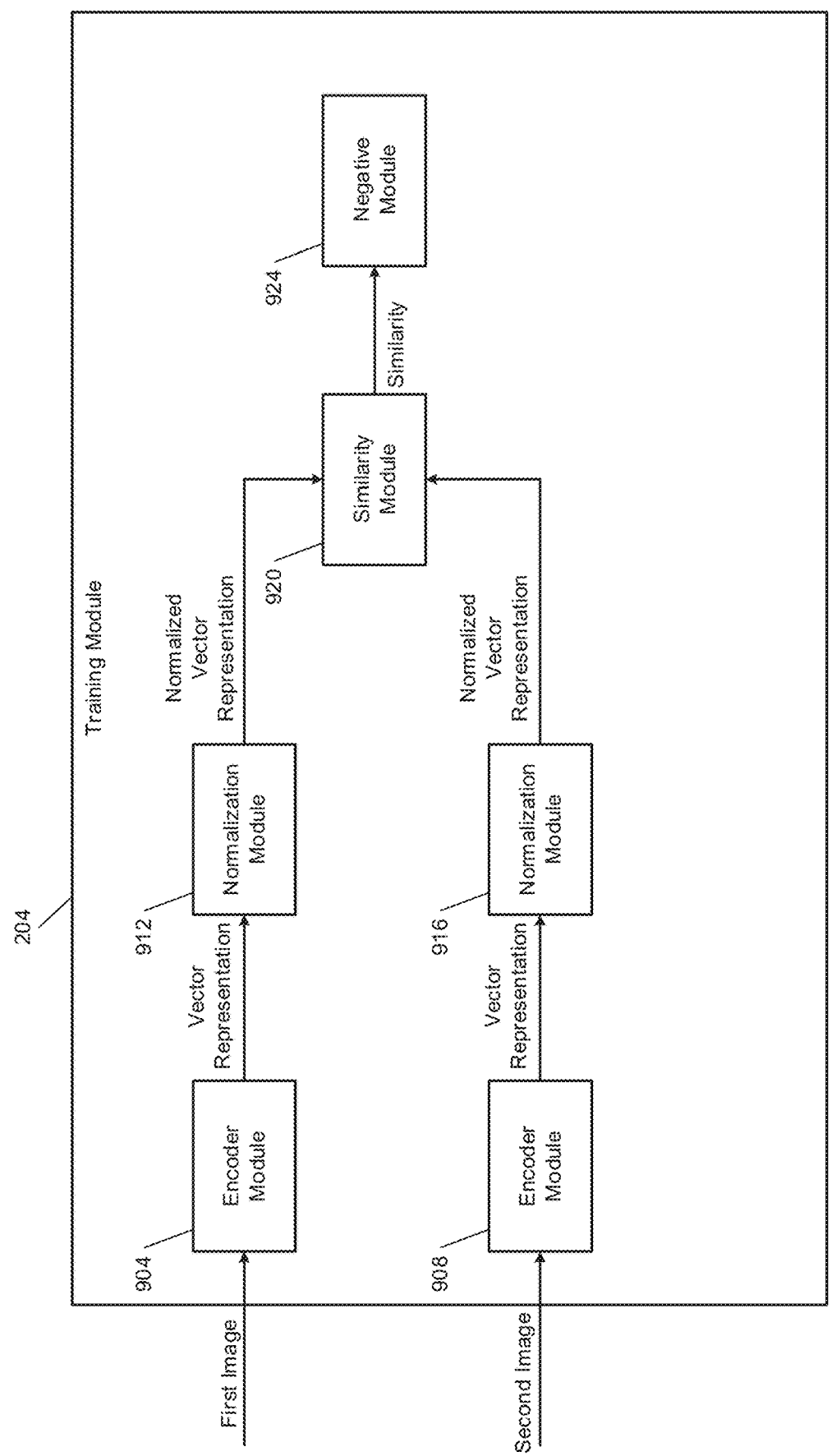
FIG. 9 is a functional block diagram of an example portion of the training module for selecting hard negatives.

FIG. 9 is a functional block diagram of an example portion of the training module 204 for selecting hard negatives. A first encoder module 904 encodes (embeds) a first image (image or portion of an image) into a (feature) vector representation of the first image. The vector representation is a vector representative of features in the first image. The first encoder module 904 may include, for example, a convolutional neural network (CNN) or another suitable type of encoder configured to generate vector representations of features in images. The first encoder module 904 may use the same type of encoding as the encoder module 404.

A second encoder module 908 encodes (embeds) a second image (image or portion of an image) into a (feature) vector representation of the second image. The vector representation is a vector representative of features in the second image. The second encoder module 908 may include, for example, a CNN or another suitable type of encoder configured to generate vector representations of features in images (images). The second encoder module 908 may use the same type of encoding as the first encoder module 904. The input module 212 may select the first and second images, such as randomly, and input the first and second images for a determination of whether the second image is a negative relative to the first image. This may be performed for each of the training images 208 or a subset of the training images 208.

In various implementations, normalization modules 912 and 916 may normalize the outputs of the first and second encoder modules 904 and 908. For example, the normalization modules 912 and 916 may perform L2 normalization or another suitable type of normalization. In various implementations, the normalization modules 912 and 916 may be omitted.

A similarity module 920 determines a similarity value representative of the similarity between the first and second images based on the outputs of the normalization modules 912 and 916 or the encoder modules 904 and 908 in the example of the omission of the normalization modules 912 and 916. For example only, the similarity module 920 may multiply the vectors to determine the similarity value for the first and second images. In various implementations, the similarity value may increase as the similarity between the first and second images increases and vice versa. Alternatively, the similarity value may decrease as the similarity between the first and second images increases and vice versa. A similarity value may be determined for each different pair of the training images 208 or a subset of the pairs of the training images 208 (e.g., until at least a predetermined number of negatives have been identified for a predetermined number or all of the training images 208).

A negative module 924 determines whether the second image is a hard negative image relative to the first image based on the similarity value for the first and second images. For example, the negative module 924 may determine that the second image is a hard negative image relative to the first image when the similarity value is greater than a predetermined value or is one of the N highest similarity values for the first image, where N is an integer greater than or equal to 1. As another example, the negative module 924 may determine that the second image is a hard negative image relative to the first image when the similarity value is less than a predetermined value or is one of the N lowest similarity values for the first image. The negative module 924 stores a listing of the hard negatives for the training images 208, respectively, in the negative memory 408 for use during the training.

Figure 10:
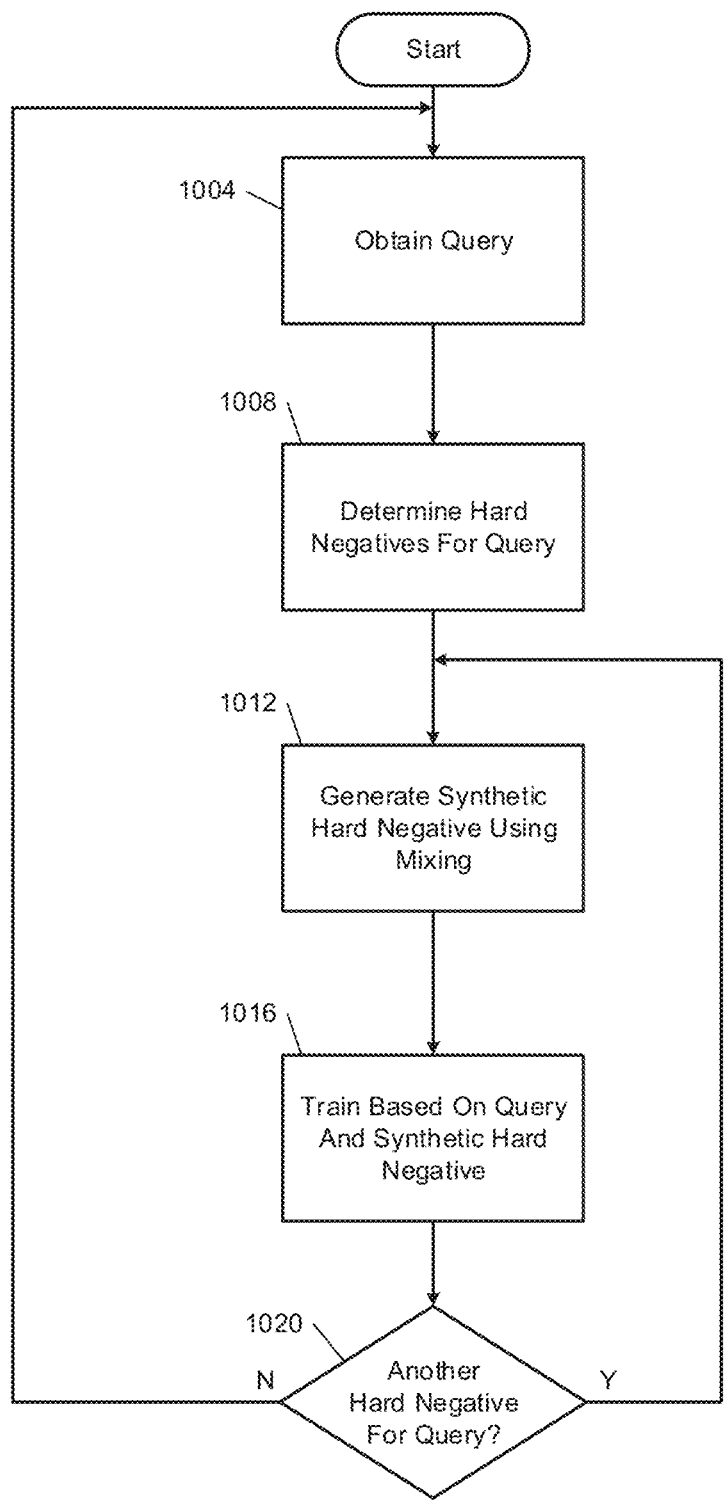
FIG. 10 is a flowchart depicting an example method of training.

FIG. 10 is a flowchart depicting an example method of training. Control begins at 1004 where the encoder module 404 obtains a query image. The encoder module 404 generates the (feature) vector representation using the encoder (e.g., including the CNN) based on the query image.

At 1008, the mixing module 412 determines the hard negatives associated with the query image in the negative memory 408. At 1012, the mixing module 412 selects one of the hard negatives and generates a vector representation for a synthetic hard negative for the query by mixing the vector representation of the selected hard negative with the vector representation of the query or the vector representation of another one of the hard negatives associated with the query image. At 1016, the adjustment module 428 selectively adjusts one or more parameters of the encoder module 404 based on the vector representation of the query image and the vector representation resulting from the mixing. For example, the loss module 424 may determine the loss based on the vector representation of the query image and the vector representation resulting from the mixing, and the adjustment module 428 may selectively adjust the parameter(s) based on the loss. At 1020, the training module 204 may determine whether one or more other hard negatives are associated with the query image. If 1020 is true, the mixing module 412 may select another one of the hard negatives, and control may return to 1012. If 1020 is false, control may return to 1004 for a new query.

The example of FIG. 10 may be repeated a predetermined number of times for the training. Once training is complete (e.g., when the loss is less than a predetermined value or once a predetermined number of epochs have been completed), the characteristics of the encoder module 404 may be stored to the feature module 112 for generating feature vectors based on input images. Each epoch may include performance of FIG. 10 the predetermined number of times.

While the example of FIG. 10 illustrates generating a synthetic hard negative, training, generating another hard negative, training, and so on, the present application is also applicable to generating a larger set (N, such as all) synthetic hard negatives and training based on the larger set of synthetic hard negatives. This alternative is described above, such as in the denominator of equation 1.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A training system comprising:
an encoder module configured to receive a query image and to generate a first vector representative of one or more features in the query image using an encoder;
a mixing module configured to generate a second vector by mixing a third vector, representative of one or more features in a second image that is classified as a negative relative to the query image, with a fourth vector; and
an adjustment module configured to train the encoder by selectively adjusting one or more parameters of the encoder based on the first vector and the second vector.

2. The training system of claim 1 wherein the mixing module is configured to use the first vector as the fourth vector.

3. The training system of claim 1 wherein the fourth vector is representative of one or more features in a third image that is classified as a negative relative to the query image.

4. The training system of claim 1 further comprising:
a first normalization module configured to normalize the first vector; and
a second normalization module configured to normalize the second vector.

5. The training system of claim 4 wherein:
the first normalization module is configured to normalize the first vector using L2 normalization; and
the second normalization module is configured to normalize the second vector using L2 normalization.

6. The training system of claim 1 wherein the encoder includes a convolutional neural network (CNN).

7. The training system of claim 1 wherein the second vector includes a convex linear combination of the third vector and the fourth vector.

8. The training system of claim 1 further comprising a negative module configured to selectively classify the second image as a negative relative to the query image.

9. The training system of claim 8 further comprising a similarity module configured to generate a similarity value based on the first vector and the second vector,
wherein the negative module is configured to classify the second image as a negative relative to the query image based on the similarity value.

10. The training system of claim 9 further comprising a similarity module configured to generate a similarity value based on the first vector and the second vector,
wherein the negative module is configured to classify the second image as a negative relative to the query image when the similarity value is less than a predetermined value.

11. The training system of claim 9 further comprising a similarity module configured to generate a similarity value based on the first vector and the second vector,
wherein the negative module is configured to classify the second image as a negative relative to the query image when the similarity value is greater than a predetermined value.

12. The training system of claim 9 wherein the similarity module is configured to generate the similarity value by multiplying the first vector with the second vector.

13. The training system of claim 1 wherein the second image is one of X images of a set of training images that are most similar to the query image, wherein X is an integer greater than or equal to 1.

14. The training system of claim 1 wherein the second image is classified as a hard negative relative to the query image.

15. The training system of claim 14 further comprising:
a similarity module configured to generate a similarity value based on the first vector and the second vector; and
a negative module configured to classify the second image as a hard negative relative to the query image based on the similarity value.

16. The training system of claim 1 wherein no text descriptive of the query image or the second image is stored in memory.

17. A navigating robot, comprising:
a camera configured to capture images;
a feature module including an encoder trained by the training system of claim 1 and configured to:
receive an image from the camera; and
generate a fifth vector representative of one or more features in the image using the encoder; and
a control module configured to selectively actuate at least one propulsion device based on the fifth vector.

18. A training system comprising:
a means for:
receiving a query image; and
generating a first vector representative of one or more features in the query image using an encoder;
a means for generating a second vector by mixing a third vector, representative of one or more features in a second image that is classified as a negative relative to the query image, with a fourth vector; and
a means for training the encoder by selectively adjusting one or more parameters of the encoder based on the first vector and the second vector.

19. A training method, comprising:
by one or more processors, receiving a query image;
by the one or more processors, generating a first vector representative of one or more features in the query image using an encoder;
by the one or more processors, generating a second vector by mixing a third vector, representative of one or more features in a second image that is classified as a negative relative to the query image, with a fourth vector; and
by the one or more processors, training the encoder by selectively adjusting one or more parameters of the encoder based on the first vector and the second vector.

20. The training method of claim 19 wherein:
the second image is classified as a hard negative relative to the query image; and
the training method further includes:
  by the one or more processors, generating a similarity value based on the first vector and the second vector; and
  by the one or more processors, classifying the second image as a hard negative relative to the query image based on the similarity value.

* * * * *